United States Patent
Mozaffari et al.

(10) Patent No.: US 11,847,853 B2
(45) Date of Patent: Dec. 19, 2023

(54) DEVICE FOR OPTICAL IMAGING OF FEATURES OF A HAND

(71) Applicant: DOCTER OPTICS SE, Neustadt an der Orla (DE)

(72) Inventors: Mohsen Mozaffari, Gera (DE); Siemen Kuhl, Munich (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 0 days.

(21) Appl. No.: 17/961,920

(22) Filed: Oct. 7, 2022

(65) Prior Publication Data
US 2023/0028172 A1  Jan. 26, 2023

Related U.S. Application Data

(63) Continuation of application No. 16/868,637, filed on May 7, 2020, now abandoned.

(30) Foreign Application Priority Data

May 8, 2019 (DE) .......................... 102019112048.9
Sep. 30, 2019 (DE) .......................... 102019126419.7

(51) Int. Cl.
G06V 40/13 (2022.01)
G02B 3/00 (2006.01)
(Continued)

(52) U.S. Cl.
CPC ....... *G06V 40/1312* (2022.01); *G02B 3/0081* (2013.01); *G06V 10/143* (2022.01);
(Continued)

(58) Field of Classification Search
CPC .......... G06K 9/00033; G06K 9/00362; G06K 2009/00932; G06V 40/1312; G06V 40/10;
(Continued)

(56) References Cited

U.S. PATENT DOCUMENTS

| 751,347 | A | 2/1904 | Scheimpflug |
| 4,428,670 | A | 1/1984 | Ruell |

(Continued)

FOREIGN PATENT DOCUMENTS

| AU | 2004280968 A1 | 4/2005 | |
| AU | 2004280968 A1 * | 4/2006 | ............. G03B 17/04 |

(Continued)

OTHER PUBLICATIONS

F. Liu, D. Zhang, C. Song and G. Lu, "Touchless Multiview Fingerprint Acquisition and Mosaicking," in IEEE Transactions on Instrumentation and Measurement, vol. 62, No. 9, pp. 2492-2502, Sep. 2013, doi: 10.1109/TIM.2013.2258248. (Year: 2013).*

(Continued)

*Primary Examiner* — Michael Robert Cammarata
(74) *Attorney, Agent, or Firm* — BARNES & THORNBURG LLP

(57) ABSTRACT

The present disclosure relates to a device for contactless optical imaging of features of a hand, wherein the device comprises an illumination arrangement for illuminating a measuring site with light of substantially a first wavelength and with light of at least substantially a second wavelength. The device further comprising a camera comprising a detector and objective configured for imaging the measuring site on the detector. Within the measuring site a region of depth of field of the objective with respect to the first wavelength overlaps with a region of depth of field of the objective with respect to the second wavelength.

20 Claims, 4 Drawing Sheets

(51) Int. Cl.
*G06V 10/143* (2022.01)
*G06V 40/10* (2022.01)
*G06V 40/14* (2022.01)

(52) U.S. Cl.
CPC .......... *G06T 2200/04* (2013.01); *G06V 40/10* (2022.01); *G06V 40/14* (2022.01)

(58) Field of Classification Search
CPC ... G06V 30/43; G02B 3/0081; G06T 2200/04
See application file for complete search history.

(56) References Cited

U.S. PATENT DOCUMENTS

| | | | | |
|---|---|---|---|---|
| 4,544,267 | A | | 10/1985 | Schiller |
| 4,783,167 | A | | 11/1988 | Schiller |
| 4,787,742 | A | * | 11/1988 | Schiller ............. G06V 40/1312 382/126 |
| 4,936,680 | A | | 6/1990 | Henkes |
| 5,177,353 | A | | 1/1993 | Schiller |
| 5,548,394 | A | * | 8/1996 | Giles ................. G06V 40/1324 356/71 |
| 5,650,842 | A | | 7/1997 | Maase |
| 5,736,734 | A | | 4/1998 | Marcus |
| 6,175,407 | B1 | | 1/2001 | Sartor |
| 6,195,448 | B1 | | 2/2001 | Schiller |
| 6,956,608 | B1 | | 10/2005 | Shapiro |
| 7,199,868 | B2 | * | 4/2007 | Maase ................ G06V 40/1324 356/71 |
| 8,320,645 | B2 | * | 11/2012 | Maase ................ G02B 13/24 382/126 |
| 8,600,123 | B2 | * | 12/2013 | Abramovich ...... G06V 40/1312 382/126 |
| 8,816,817 | B2 | * | 8/2014 | Hama ................ G06V 40/1312 340/5.82 |
| 8,953,030 | B1 | * | 2/2015 | Liphardt ................ G01N 21/55 348/61 |
| 9,122,900 | B2 | * | 9/2015 | Aoki ................. G06V 40/145 |
| 10,412,286 | B2 | * | 9/2019 | Moggridge .......... H04N 23/951 |
| 10,859,439 | B1 | * | 12/2020 | Lihardt ................ G01J 3/0289 |
| 11,080,511 | B2 | * | 8/2021 | Shannon ............ G06V 40/1312 |
| 11,160,685 | B1 | * | 11/2021 | Homer ................ A61F 9/00802 |
| 2002/0018584 | A1 | | 2/2002 | Johnson |
| 2003/0012416 | A1 | | 1/2003 | Ryabov |
| 2003/0142862 | A1 | * | 7/2003 | Snow ...................... G01C 11/06 382/154 |
| 2004/0012775 | A1 | * | 1/2004 | Kinney ............... G01N 21/9501 356/237.2 |
| 2006/0104492 | A1 | * | 5/2006 | Maase ................ G06V 40/1324 382/124 |
| 2006/0169159 | A1 | * | 8/2006 | Reinhold ........... G06V 40/1324 101/454 |
| 2006/0291704 | A1 | | 12/2006 | McClurg |
| 2007/0121098 | A1 | * | 5/2007 | Maase ................ G06V 40/1324 356/71 |
| 2009/0080709 | A1 | * | 3/2009 | Rowe ................... G06V 10/143 382/115 |
| 2009/0103788 | A1 | * | 4/2009 | Maase ................ G06V 40/1324 382/124 |
| 2009/0190093 | A1 | * | 7/2009 | Tanassi .................. A61B 3/117 351/208 |
| 2010/0110275 | A1 | * | 5/2010 | Mathieu ............. G02B 27/0075 382/117 |
| 2012/0062781 | A1 | * | 3/2012 | Gfeller .................... G03B 5/02 348/335 |
| 2012/0105628 | A1 | * | 5/2012 | Fukuchi ................. G01P 5/001 348/135 |
| 2014/0044323 | A1 | * | 2/2014 | Abramovich ...... G06V 40/1312 382/124 |
| 2015/0097936 | A1 | * | 4/2015 | Simske ................. G02B 17/08 348/77 |
| 2015/0130917 | A1 | * | 5/2015 | Mil'shtein ......... G06V 40/1335 348/77 |
| 2016/0342835 | A1 | * | 11/2016 | Kaehler ................. G06V 40/19 |
| 2017/0367651 | A1 | * | 12/2017 | Tzvieli ................. A61B 5/0075 |
| 2018/0068100 | A1 | * | 3/2018 | Seo ....................... G06F 21/6218 |
| 2018/0288292 | A1 | * | 10/2018 | Moggridge ............. G01J 3/506 |
| 2019/0057494 | A1 | * | 2/2019 | Kusumi .................. G06T 5/006 |
| 2019/0381736 | A1 | * | 12/2019 | Jensen .................... H04N 23/45 |
| 2020/0005567 | A1 | * | 1/2020 | Chiu ...................... G02B 13/18 |
| 2020/0074132 | A1 | * | 3/2020 | Shannon ............ G06V 40/1347 |
| 2020/0236290 | A1 | * | 7/2020 | Kawasaki ............ H04N 23/959 |
| 2020/0318954 | A1 | * | 10/2020 | Wolke .................... G02B 26/10 |
| 2020/0323427 | A1 | * | 10/2020 | Gharib ................. A61B 5/7278 |
| 2020/0356752 | A1 | * | 11/2020 | Mozaffari .......... G06V 40/1312 |
| 2021/0052160 | A1 | * | 2/2021 | König ..................... A61B 5/444 |
| 2021/0152810 | A1 | * | 5/2021 | Jensen ................ H04N 13/246 |
| 2021/0192759 | A1 | * | 6/2021 | Lang ......................... G06T 3/40 |
| 2021/0199946 | A1 | * | 7/2021 | Gaiduk ................ G02B 21/008 |
| 2021/0318558 | A1 | * | 10/2021 | Tzvieli ............... G02B 27/0176 |
| 2022/0079675 | A1 | * | 3/2022 | Lang ........................ G02B 30/52 |
| 2022/0327307 | A1 | * | 10/2022 | Mohapatra ............ G06V 30/43 |

FOREIGN PATENT DOCUMENTS

| | | | | |
|---|---|---|---|---|
| CA | 2731386 | A1 | * | 1/2010 ............. A61B 3/107 |
| CA | 2731386 | A1 | | 1/2010 |
| DE | 4421243 | A1 | | 12/1994 |
| DE | 10239375 | A1 | | 2/2004 |
| DE | 10239375 | A1 | * | 2/2004 ......... G06K 9/00033 |
| DE | 69921509 | T2 | | 3/2006 |
| DE | 102009058668 | A1 | | 6/2011 |
| DE | 102018109726 | A1 | | 10/2019 |
| DE | 102018109726 | A1 | * | 10/2019 |
| DE | 102019101490 | A1 | * | 7/2020 ............... G03B 3/10 |
| DE | 102019101490 | A1 | | 7/2020 |
| EP | 0045917 | A1 | | 2/1982 |
| EP | 0308162 | A2 | | 3/1989 |
| EP | 3868202 | A1 | * | 8/2021 |
| EP | 3868202 | A1 | | 8/2021 |
| ES | 2370461 | T3 | | 12/2011 |
| ES | 2370461 | T3 | * | 12/2011 ........... A61B 3/1005 |
| JP | 2003016432 | A | | 1/2003 |
| JP | 2003016432 | A | * | 1/2003 ......... G06K 9/00046 |
| JP | 3559472 | B2 | | 9/2004 |
| JP | 3559472 | B2 | * | 9/2004 |
| JP | 2017093904 | A | | 6/2017 |
| JP | 2017093904 | A | * | 6/2017 |
| JP | 2021164840 | A | | 10/2021 |
| JP | 2022050738 | A | * | 3/2022 |
| RU | 2474876 | C2 | * | 2/2013 ......... G06K 9/00046 |
| RU | 2474876 | C2 | | 2/2013 |
| WO | 0079215 | A1 | | 12/2000 |
| WO | 0188835 | A1 | | 11/2001 |
| WO | 0215566 | A1 | | 2/2002 |
| WO | 03027941 | A1 | | 4/2003 |
| WO | 2020241061 | A1 | | 12/2020 |
| WO | 2020254445 | A1 | | 12/2020 |
| WO | WO-2020241061 | A1 | * | 12/2020 ......... G01B 11/0608 |
| WO | WO-2020254445 | A1 | * | 12/2020 ........... H04N 13/218 |
| WO | 2021161030 | A1 | | 8/2021 |
| WO | 2021200827 | A1 | | 10/2021 |
| WO | WO-2021200827 | A1 | * | 10/2021 |

OTHER PUBLICATIONS

A. Elli, "Understanding the color of human skin," in Proc. 6th SPIE Conf. Human Vision Electron. Imag. SPIE, vol. 4299, 2001, pp. 243-251. (Year: 2001).*

L. Wang, R. El-Maksoud, J. Sasian, and V. Valencia, "Illumination scheme for high-contrast, contactless fingerprint images," Proc. SPIE, vol. 7429, pp. 742911-1-742911-7, 2009. (Year: 2009).*

G. Parziale and E. Diaz-Santana, "The surround imager: A multicamera touchless device to acquire 3-D rolled-equivalent fingerprints," in Proc. Int. Conf. Biometrics (ICB), vol. 3832, 2006, pp. 244-250. (Year: 2005).*

R. Merkel, "Latent Fingerprint Aging from a Hyperspectral Perspective: First Qualitative Degradation Studies Using UV/VIS Spectroscopy," 2015 Ninth International Conference on IT Security Incident Management & IT Forensics, 2015, pp. 121-135, doi: 10.1109/IMF.2015.18. (Year: 2015).*

(56) References Cited

OTHER PUBLICATIONS

Yeegahng Song, Chulhan Lee and Jaihie Kim, "A new scheme for touchless fingerprint recognition system," Proceedings of 2004 International Symposium on Intelligent Signal Processing and Communication Systems, 2004. ISPACS 2004., 2004, pp. 524-527, doi: 10.1109/ISPACS.2004.1439111. (Year: 2004).*
Electronic Fingerprint Transmission Specificaction [sic] EFTS-IQS 7.1 of the FBI, May 2005. (Year: 2005).*
Federal Bureau of Investigation, "Electronic Fingerprint Transmission Specification" May 2, 2005, 215 pages.
L. Wang, R. El-Maksoud, J. Sasian, and V. Valencia, "Illumination scheme for high-contrast, contactless fingerprint images," Proc. SPIE, vol. 7429, p. 742911-1-742911-7, 2009. (Year: 2009).
G. Parziale and E. Diaz-Santana, "The surround imager: A multicamera touchless device to acquire 3-D rolled-equivalent fingerprints," in Proc. Int. Conf. Biometrics (ICB), vol. 3832, 2006, pp. 244-250. (Year: 2006).
R. Merkel, "Latent Fingerprint Aging from a Hyperspectral Perspective: First Qualitative Degradation Studies Using UVA VIS Spectroscopy," 2015 Ninth International Conference on IT Security Incident Management & IT Forensics, 2015, pp. 121-135, doi: 0.1109/IMF.2015.18. (Year: 2015).
Office Action dated Dec. 10, 2021 for U.S. Appl. No. 16/868,637 (pp. 1-30).
Norman Koren, "Understanding Image Sharpness Part 1: Introduction to Resolution and MTF Curves," available from http://www.normankoren.com/Tutorials/MTF.html, last accessed on Feb. 22, 22, 10 pages.
Bass, Michael et al. Handbook of Optics, Second Edition, vol. II, McGraw Hill, 1995, (Year: 1995).
Office Action (Final Rejection) dated May 13, 2022 for U.S. Appl. No. 16/868,637 (pp. 1-41).

* cited by examiner

DEVICE FOR OPTICAL IMAGING OF FEATURES OF A HAND

PRIORITY CLAIM

This application is a continuation of U.S. patent application Ser. No. 16/868,637, filed May 7, 2020, which claims priority to German Patent Application DE 10 2019 112 048.9 filed May 8, 2019 and German Patent Application DE 10 2019 126 419.7 filed Sep. 30, 2019, each of which is expressly incorporated by reference herein.

BACKGROUND

The present disclosure relates to a device for optical imaging of features of a hand. This present disclosure also relates to finger scanners, for example contactless finger scanners.

SUMMARY

According to the present disclosure, a device for contactless optical imaging of features of a hand is provided.

In illustrative embodiments, the device comprises an illumination arrangement for illuminating a measuring site with light of substantially a first wavelength and with light of at least substantially a second wavelength.

In illustrative embodiments, the device further comprises a camera comprising a detector and objective configured for imaging the measuring site on the detector. Within the measuring site a region of depth of field of the objective with respect to the first wavelength overlaps with a region of depth of field of the objective with respect to the second wavelength.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
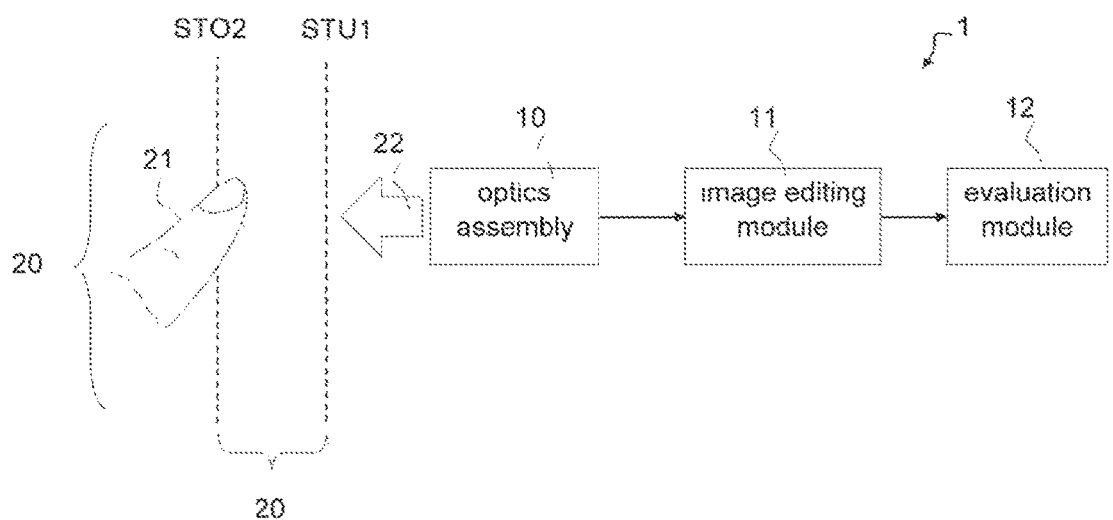
FIG. 1 shows an embodiment of a device for optical imaging of features of a hand, for example for optical imaging of features of fingers, which device is designed as a finger scanner.

According to an illustrative embodiment, a device for contactless optical imaging of features of a hand (in or on a measuring site, wherein the device comprises an illumination means for illuminating the measuring site (with light, for example with light having substantially one first wavelength and at least with light having substantially one second wavelength) is provided, wherein the device comprises one first camera for capturing light that is radiated ((diffusely) reflected) from a hand or a part of a hand at the measuring site, and at least one second camera for capturing light that is radiated ((diffusely) reflected) from the hand or the part of the hand at the measuring site. The above-mentioned device for optical imaging of features of a hand is configured for example such that it complies with the guidelines EFTS-IQS 7.1.

Within the meaning of the disclosure, a device for optical imaging of features of a hand is for example a finger scanner or a fingerprint scanner. Within the meaning of the disclosure, features of a hand are for example fingerprints.

In an illustrative embodiment of the present disclosure, a camera comprises an objective and a detector. Thus, in another illustrative embodiment of the present disclosure, the camera comprises a first detector and a first objective. In another illustrative embodiment of the present disclosure, the second camera comprises a second detector and a second objective. In an illustrative embodiment of the present disclosure, the first detector is tuned to the first wavelength and to the second wavelength. In another illustrative embodiment of the present disclosure, the second detector is tuned to the first wavelength and to the second wavelength. A detector within the meaning of this disclosure is for example an image sensor. A detector within the meaning of this disclosure is for example a device that receives light and converts it into a corresponding electrical signal having the information content of a recorded image. An image editing module for evaluating or processing the image acquired by the detector can be arranged downstream of the detector. In an illustrative embodiment of the present disclosure, the image editing module generates a three-dimensional image of the surface of the hand or of a part of the hand, for example the fingerprints. In one embodiment of the present disclosure, the first objective is designed so as to be identical to the second objective, and/or the first objective is designed so as to be identical to the second objective. The first camera and the second camera are for example arranged in a Scheimpflug layout, or the first detector and the second detector are arranged so as to be tilted, with respect to a or the measuring plane or a plane in the measuring site, such that they meet the Scheimpflug conditions. Particulars regarding Scheimpflug layout or Scheimpflug conditions are addressed in U.S. Pat. No. 751,347, which is incorporated by reference in its entirety.

The detector or the first detector and the second detector and/or the image editing module are matched to one another such that the, for example three-dimensional, image of the surface of the hand or of a part of the hand, for example the fingerprints, is generated on the basis of light of the first wavelength and light of the second wavelength, and/or substantially exclusively. Within the above meaning, "substantially" is intended to mean that light at different wavelengths at most only insignificantly influences the definition of the image. Alternatively or in addition, the measuring site is merely substantially illuminated with light of the first wavelength and with light of the second wavelength (optionally with light of a third wavelength), such that the, for example three-dimensional, image of the surface of the hand or of a part of the hand, for example the fingerprints, is generated on the basis of light of the first wavelength and light of the second wavelength, and/or substantially exclusively.

An illumination means within the meaning of this disclosure for example allows for emission of light (of at least two different wavelength(ranges)), for example of the first wavelength and of the second wavelength, or of a wavelength corresponding to the first wavelength and a wavelength corresponding to the second wavelength. It may also be possible for the illumination means to comprise at least two lamps, wherein a first lamp emits light of the first wavelength or of a wavelength corresponding to the first wavelength, and a second lamp emits light of the second wavelength or of a wavelength corresponding to the second wavelength. An illumination means within the meaning of the disclosure can for example comprise an LED array or (at least) two LED arranges, and a reflector and/or a lens for orienting the light radiated by an LED array. It may be possible for the first lamp to be associated with a first illumination objective for orienting the light of the first lamp. It may be possible for the second lamp to be associated with a second illumination objective for orienting the light of the second lamp. It may be possible for the first lamp and the second lamp to be associated with a common illumination objective for orienting both light from the first lamp and light from the second lamp.

For example, it is intended for the second wavelength to be larger than the first wavelength. In one embodiment of the present disclosure, the first wavelength is no less than 400 nm. In one embodiment of the present disclosure, the first wavelength is no greater than 650 nm. In one embodiment of the present disclosure, the second wavelength is no less than 450 nm. In one embodiment of the present disclosure, the second wavelength is no greater than 670 nm.

In another illustrative embodiment of the present disclosure, the device for optical imaging of features of a hand, or the first camera, comprises first objective for imaging the measuring site on a first detector.

In another illustrative embodiment of the present disclosure, the device for optical imaging of features of a hand, or the second camera, comprises second objective for imaging the measuring site on a second detector.

In another illustrative embodiment of the present disclosure, the region of depth of field of the first objective with respect to the first wavelength overlaps with the region of depth of field of the first objective with respect to the second wavelength.

In another illustrative embodiment of the present disclosure, the region of depth of field of the second objective with respect to the first wavelength overlaps with the region of depth of field of the second objective with respect to the second wavelength.

In an illustrative embodiment of the present disclosure, the device does not comprise a contact window having a contact surface to be touched by the part of the hand of which the features are intended to be determined.

In another illustrative embodiment of the present disclosure, the device comprises a third camera for recording an image of the measuring site, wherein the region of depth of field of the second objective with respect to the first wavelength overlaps with the region of depth of field of the second objective with respect to the second wavelength.

In another illustrative embodiment of the present disclosure, the distance between the first objective and the measuring site is at least 150 mm. In another illustrative embodiment of the present disclosure, the distance between the second objective and the measuring site is at least 150 mm. In a further preferred embodiment of the present disclosure, the distance between the third objective and the measuring site is at least 150 mm.

Within the meaning of this disclosure, a wavelength is for example a central wavelength. Within the meaning of this disclosure, a wavelength or a central wavelength is for example an average wavelength. Within the meaning of this disclosure, a wavelength or a central wavelength is for example an average wavelength, wherein a spectrum is averaged such that the power thereof is weighted. Within the meaning of this disclosure, a central wavelength is for example the wavelength that has its greatest light intensity or luminous power in an, for example narrow, spectrum. Within the meaning of this disclosure, light having a narrow spectrum is for example light of an LED or light as is conventionally used for finger scanners.

Figure 2:
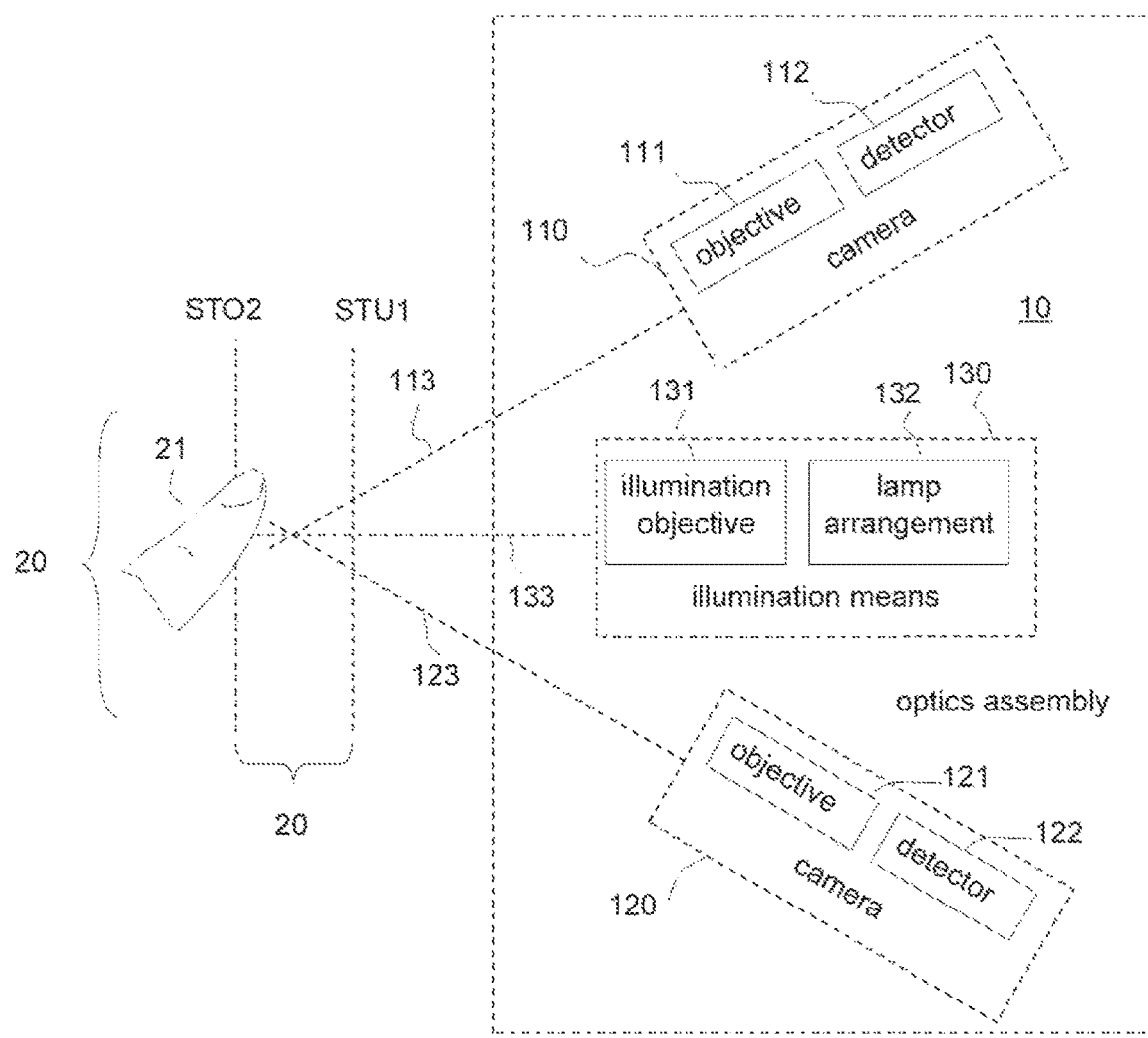
FIG. 2 shows an embodiment for an optics module according to FIG. 1.

FIG. 1 shows a device 1 for optical imaging of features of a hand, for example optical imaging of features of fingers, i.e. for example for identifying fingerprints, referred to in the following as a finger scanner 1. The finger scanner 1 comprises an optics assembly 10, shown in FIG. 2, comprising an illumination means 130 for illuminating a measuring site 20 of light 22 of a substantially first wavelength, and light of a substantially second wavelength. This light 22 illuminates a finger 20 at the measuring site 20 for example. The illumination means 130 comprises a lamp arrangement 132 and an illumination objective 131 for orienting light from the lamp arrangement 132, i.e. for generating the light 22. Reference character 133 denotes the optical axis of the objective 131. The lamp arrangement 132 generates light that includes light of the first wavelength and at least light of the second wavelength. For this purpose, the lamp arrangement 132 comprises a first lamp having light of a first wavelength, and a second lamp for generating light of the second wavelength.

It may be possible for the second lamp to be assigned a second illumination objective for orienting the light of the second lamp. It may preferably be possible for the first lamp and the second lamp to be assigned a common illumination objective for orienting both light of the first lamp and light of the second lamp.

The optics assembly 10 further comprises a camera 110 and a camera 120. The camera 110 comprises a detector 112 and an objective 111 for imaging the measuring site 20 on the detector 112. The objective 111 is an embodiment of objective within the meaning of the claims. The camera 120 comprises a detector 122 and an objective 121 for imaging the measuring site 20 on the detector 122. The objective 121 is an embodiment for objective within the meaning of the claims. The finger scanner 1 operates in a contactless manner, i.e. during measurement of the fingerprints, the corresponding part of the finger does not rest on a contact window or a corresponding pad.

Reference character 113 denotes the optical axis of the objective 111, and reference character 123 denotes the optical axis of the objective 121. The two optical axes 113 and 123 are not mutually parallel, but rather preferably intersect at the measuring site 20. The cameras 110 and 120 are for example arranged in a Scheimpflug layout, or the detectors 112 and 122 are arranged so as to be tilted, with respect to the measuring plane, such that they fulfil the Scheimpflug conditions.

The finger scanner 1 further comprises an image editing module 11 for creating a 3D image (three-dimensional image) from the output signals of the cameras 110 and 120. The starting value of the image editing module 11 is a three-dimensional image of the fingerprints of the finger 21 at the measuring site 20. The finger scanner 1 furthermore comprises an evaluation module 12 for storing and/or evaluating the 3D image of the fingerprints.

Figure 3:
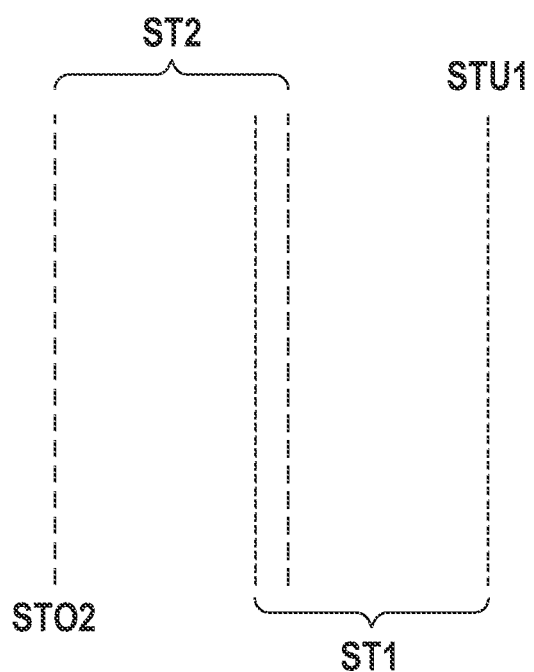
FIG. 3 shows an embodiment of a measuring site comprising two overlapping regions of different depths of field.
Figure 4:
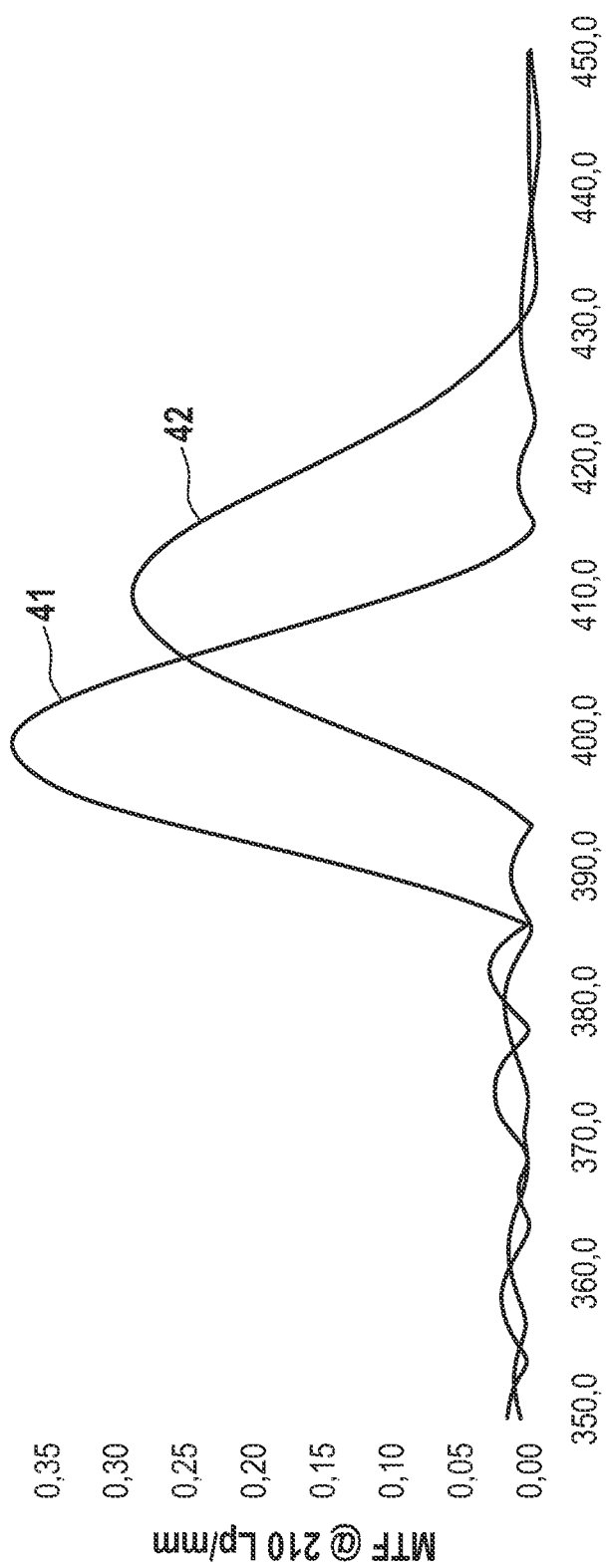
FIG. 4 shows an embodiment for the ratio of image contrast to object contrast, plotted against the distance from an objective for two wavelengths, from which depth of field can be determined.

FIG. 3 shows the measuring site 20 having the boundaries STU1 and STO2 thereof. In this case, the extension of the measuring site 20 is made up from the overlap of depth of field of the objectives 111 and 121 at a first wavelength, and depth of field of the objectives 111 and 121 at a second wavelength. This is also clear for example from FIG. 4. In this case, reference character 41 denotes the MTF@210/LP/mm, F/#=4.5, plotted against the distance from the object, in millimeters, at a wavelength of 462 nm, and reference character 42 denotes the MTF@210/LP/mm, F/#=4.5, plotted against the distance from the object, in millimeters, at a wavelength of 530 nm.

In this case, the following parameters apply, wherein $\lambda 1$ denotes the first wavelength and $\lambda 2$ denotes the second wavelength:

FOV=150 mm×100 mm→diagonal=180.2776 mm=2·90.1388 mm
$\lambda 1$=462±30 nm
$\lambda 2$=530±30 nm
magnification factor $\beta$=1/15
sensor diagonal=12 mm
f-number F/#=4.5
object-side MTF (700 dpi)>20% @14 LP/mm
sensor-side MTF>20% @210 LP/mm
object distance: 400 mm
temperature: 0°-55°

Figure 5:
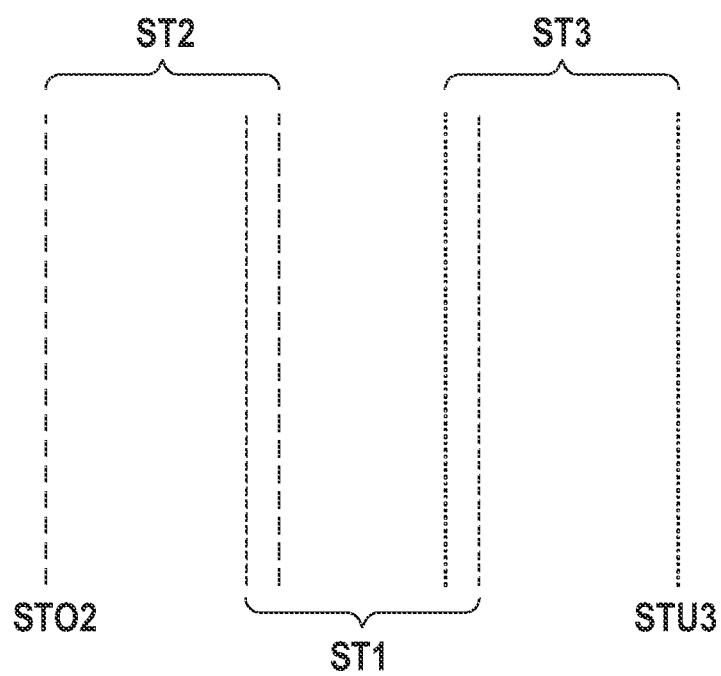
FIG. 5 shows an embodiment of a measuring site comprising three overlapping regions of different depths of field.

FIG. 5 shows, in an alternative embodiment, the measuring site 20 having the limits STU3 and STO2 thereof, wherein the value STU3 in FIG. 5 replaces the value STU1 in the embodiment according to FIG. 3. In this case, the extension of the measuring site 20 is made up of the overlap of depth of field ST1 of the objectives 111 and 121 at a first wavelength, depth of field ST2 of the objectives 111 and 121 at a second wavelength, and depth of field ST3 of the objectives 111 and 121 at a third wavelength. It is for example possible for region of depth of field ST1 at the first wavelength overlaps the region of depth of field ST2 of the second wavelength, and for the region of depth of field ST1 at the first wavelength overlaps with depth of field ST3 at the third wavelength. It is for example possible, however, for the region of depth of field ST2 at the second wavelength and the region of depth of field ST3 at the third wavelength not to overlap, or to at most have a merely negligible overlap.

The elements, distances and angles in FIGS. 1, 2, 3 and 5 are shown in a manner that takes account of simplicity and clarity, and are not necessarily drawn true-to-scale. Therefore, for example, some elements, distances and angles are shown in an exaggerated scale compared with other elements, distances and angles, in order to aid understanding of the embodiments of the present disclosure.

The present disclosure provides for an improved device for optical imaging of features of a hand. It is also provided for manufacturing a device for optical imaging of features of a hand or finger scanners respectively, or a fingerprint scanner, in a cost-effective manner.

A device for optical imaging of features of a hand is disclosed in DE 699 21 509 T2. In this case, the device for optical imaging of features of a hand, disclosed in DE 699 21 509 T2, comprises a light source for illuminating an imaging region, and a convex contact surface that is left free, in order to come into contact with a hand, and in order to guide regions of the hand through the imaging region in a manner in firm contact with the contact surface, by means of moving relative to the imaging region.

DE 44 21 243 A1 discloses a device for inputting an image of a fingerprint, wherein light is directed onto a finger that is arranged on an image acquisition surface of a prism, wherein the light is directed onto a finger that is arranged on an image acquisition surface of a prism, wherein the light striking the surface is at an angle that is smaller than the critical angle for total internal reflection, and wherein an image sensor acquires light which is diffusely reflected by the fingerprint.

EP 0 045 917 A1 discloses a fingerprint sensor for generating an electrical output signal that corresponds to the finger to be studied, wherein the fingerprint sensor comprises a contact member that is formed of a transparent resilient material, at least in part, and that is attached to a planar carrier plate, wherein a light receiving surface, and a contact surface for absorbing a contact pressure from the finger are disclosed.

DE 10 2009 058 668 A1 discloses a device for optical imaging of features of a hand, wherein the device comprises a transparent contact window having a dimensionally stable contact surface for placing a hand or a part of a hand in a contact region, an illumination means, arranged on a side of the transparent contact window facing away from the contact surface, for illuminating the contact region, and a detector for acquiring light from the contact region, and wherein the contact surface comprises a light scattering structure, at least in the contact region.

Further devices for optical imaging of features of a hand or fingerscanners, respectively, are disclosed in WO 03/027941 A1, WO 02/15566 A1, WO 01/88835 A1, WO 00/79215 A1, U.S. Pat. No. 6,195,448 B1, US 2006/0291704 A1, U.S. Pat. No. 6,956,608 B1, U.S. Pat. Nos. 5,736,734, 4,936,680, 5,177,353, 4,783,167, 4,787,742, 5,650,842, 4,544,267, and EP 0 308 162 A2.

The invention claimed is:

1. A contactless fingerprint scanner, wherein the fingerprint scanner comprises:
a measuring site for a finger;
an illumination arrangement for illuminating the measuring site by emitting light of a substantially first wavelength and by emitting light of a substantially second wavelength;
a first camera comprising a first detector and a first objective configured for imaging the measuring site on the first detector, which is configured for acquiring that image; and
at least a second camera comprising a second detector and a second objective configured for imaging the measuring site on the second detector, which is configured for acquiring that image, wherein within the measuring site a first region of depth of field of the first objective and the second objective with respect to the first wavelength overlaps with a second region of depth of field of the first objective and the second objective with respect to the second wavelength,
wherein the first region is defined by the MTF@210 Lp/mm with respect to the first objective and with respect to the second objective being larger than 0.1 with respect to the first wavelength.

2. The contactless fingerprint scanner of claim 1, wherein the first wavelength is not less than 400 nm.

3. The contactless fingerprint scanner of claim 2, wherein the second wavelength is not less than 450 nm.

4. The contactless fingerprint scanner of claim 1, wherein the first objective comprises a first optical axis and the second objective comprises a second optical axis, wherein the first optical axis being tilted with respect to the second optical axis.

5. The contactless fingerprint scanner of claim 4, wherein a distance between the first objective and the measuring site is at least 150 mm.

6. The contactless fingerprint scanner of claim 1, wherein a distance between the second objective and the measuring site is at least 150 mm.

7. The contactless fingerprint scanner of claim 6, wherein the fingerprint scanner is configured of obtaining fingerprints in compliance with Electronic Fingerprint Transmission Specification EFTSIQS 7.1 of the FBI.

8. The contactless fingerprint scanner of claim 1, wherein the contactless fingerprint scanner does not comprise a contact window having a contact surface within the measuring site.

9. A contactless fingerprint scanner, wherein the fingerprint scanner comprises:
   a measuring site for a finger;
   an illumination arrangement for illuminating the measuring site by emitting light of a substantially first wavelength and by emitting light of a substantially second wavelength;
   a first camera comprising a first detector and a first objective configured for imaging the measuring site on the first detector, which is configured for acquiring that image; and
   at least a second camera comprising a second detector and a second objective configured for imaging the measuring site on the second detector, which is configured for acquiring that image, wherein within the measuring site a first region of depth of field of the first objective and the second objective with respect to the first wavelength overlaps with a second region of depth of field of the first objective and the second objective with respect to the second wavelength,
   wherein the second region is defined by the MTF@210 Lp/mm with respect to the first objective and with respect to the second objective being larger than 0.1 with respect to the second wavelength.

10. The contactless fingerprint scanner of claim 9, wherein the first objective comprises a first optical axis and the second objective comprises a second optical axis, wherein the first optical axis being tilted with respect to the second optical axis.

11. The contactless fingerprint scanner of claim 9, wherein the first region is defined by the MTF@210 Lp/mm with respect to the first objective and with respect to the second objective being larger than 0.1 with respect to the first wavelength.

12. A contactless fingerprint scanner, wherein the fingerprint scanner comprises:
   a measuring site for a finger;
   an illumination arrangement for illuminating the measuring site, the illumination arrangement comprising a first lamp for emitting light of substantially a first wavelength, and at least a second lamp for emitting light of substantially a second wavelength;
   a first camera comprising a first detector and a first objective configured for imaging the measuring site on the first detector, which is configured for acquiring that image; and
   a second camera comprising a second detector and a second objective configured for imaging the measuring site on the second detector;
   wherein within the measuring site a first region of depth of field of the first objective and the second objective with respect to the first wavelength overlaps with a second region of depth of field of the first objective and the second objective with respect to the second wavelength,
   wherein the first region is defined by the MTF@210 Lp/mm with respect to the first objective and with respect to the second objective being larger than 0.1 with respect to the first wavelength.

13. The contactless fingerprint scanner of claim 12, wherein the second region is defined by the MTF@210 Lp/mm with respect to the first objective and with respect to the second objective being larger than 0.1 with respect to the second wavelength.

14. The contactless fingerprint scanner of claim 12, wherein the fingerprint scanner is configured of obtaining fingerprints in compliance with Electronic Fingerprint Transmission Specification EFTSIQS 7.1 of the FBI.

15. The contactless fingerprint scanner of claim 14, wherein a distance between the second objective and the measuring site is at least 150 mm.

16. A contactless fingerprint scanner, wherein the fingerprint scanner comprises:
   a measuring site for a finger, the measuring site being at least comprised of a first region and a second region which second region overlaps with the first region;
   an illumination arrangement for illuminating the measuring site by emitting light of a wavelength substantially corresponding to a first wavelength and by emitting light of a wavelength substantially corresponding to a second wavelength, the first wavelength being no less than 400 nm, the first wavelength being no greater than 650 nm, the second wavelength being no less than 450 nm, and the second wavelength being no greater than 670 nm;
   a first camera comprising a first detector and a first objective configured for imaging the measuring site on the first detector, which is configured for acquiring that image; and
   at least a second camera comprising a second detector and a second objective configured for imaging the measuring site on the second detector, which is configured for acquiring that image, wherein the first region is defined by the MTF@210 Lp/mm with respect to the first objective and with respect to the second objective being larger than 0.1 with respect to the first wavelength, and wherein the second region is defined by the MTF@210 Lp/mm with respect to the first objective and with respect to the second objective being larger than 0.1 with respect to the second wavelength,
   wherein the fingerprint scanner does not comprise a contact window having a contact surface within the measuring site.

17. The contactless fingerprint scanner of claim 16, wherein the first objective comprising a first optical axis and the second objective comprising a second optical axis, wherein the first optical axis being tilted with respect to the second optical axis.

18. The contactless fingerprint scanner of claim 16, wherein a distance between the second objective and the measuring site is at least 150 mm.

19. The contactless fingerprint scanner of claim 16, wherein the fingerprint scanner is configured of obtaining fingerprints in compliance with Electronic Fingerprint Transmission Specification EFTS-IQS 7.1 of the FBI.

20. The contactless fingerprint scanner of claim 16, wherein the first wavelength is between 432 nm and 492 nm.

* * * * *